Aug. 1, 1939.  C. M. MATTHEWS  2,167,664
MOTOR VEHICLE CONSTRUCTION
Filed June 21, 1937   2 Sheets-Sheet 1
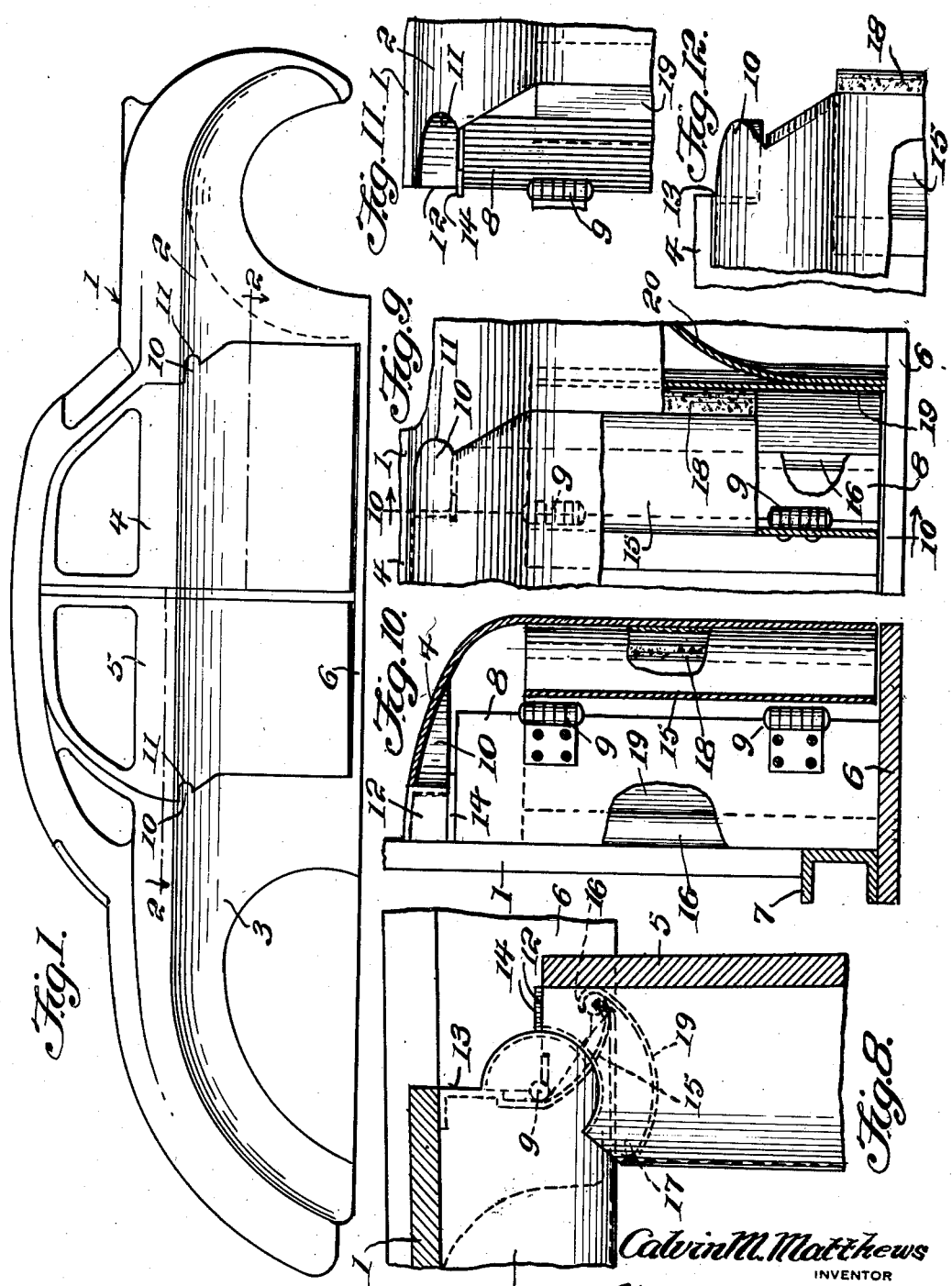
Calvin M. Matthews
INVENTOR
BY Victor J. Evans & Co.
ATTORNEYS

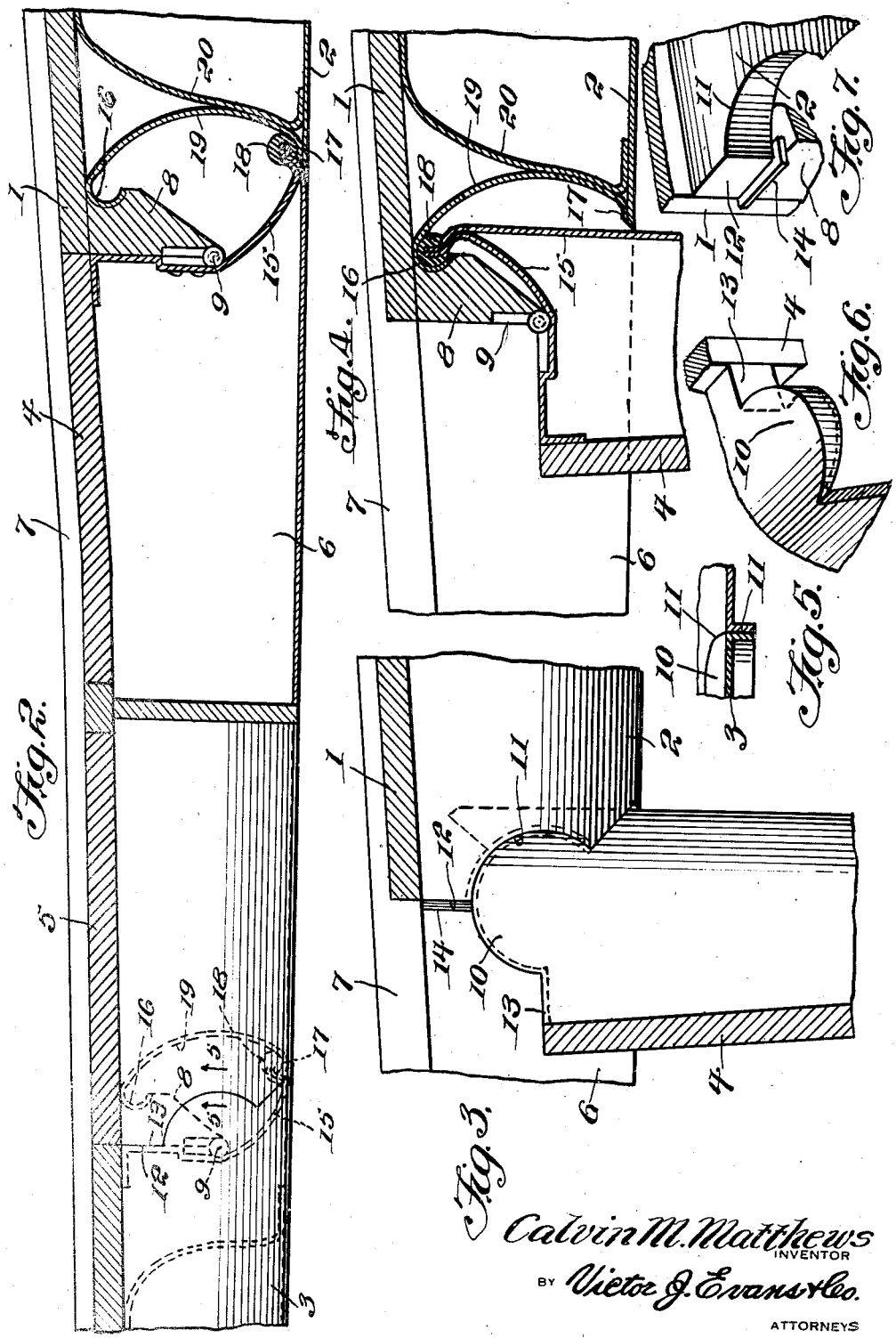

Patented Aug. 1, 1939

2,167,664

UNITED STATES PATENT OFFICE 2,167,664

MOTOR VEHICLE CONSTRUCTION

Calvin M. Matthews, Hampton, Va.

Application June 21, 1937, Serial No. 149,459

2 Claims. (Cl. 296—44)

This invention relates to motor vehicle construction and has for the primary object the provision of means for presenting a pleasing appearance and which will reduce wind resistance to a minimum by having the fenders curving outwardly and downwardly from the body and portions of the doors of the body of a curvature matching said curvature of the fender so that said portions of the doors will lie in a plane with the fenders to eliminate irregular surfaces between the fenders.

Another object of this invention is the provision of fenders and door construction and means for mounting the doors so that they may freely swing open and closed and will eliminate unsightly spaces between the doors and fenders when said doors are open or closed, also acting as door checks.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a motor vehicle body and fenders therefor and constructed in accordance with my invention.

Figure 2 is a sectional view taken on the line 2—2 of Figure 1.

Figure 3 is a fragmentary longitudinal sectional view showing one of the doors in an open position and its association with one of the fenders.

Figure 4 is a fragmentary longitudinal sectional view showing my invention acting as a check for the door when swung into an open position.

Figure 5 is a fragmentary sectional view taken on the line 5—5 of Figure 2.

Figure 6 is a fragmentary perspective view illustrating an extension element on the door located adjacent the hinged edge.

Figure 7 is a fragmentary perspective view showing a portion of the door end of a fender shaped to match the extension shown in Figure 6.

Figure 8 is a fragmentary longitudinal sectional view showing the rear door in an open position.

Figure 9 is a fragmentary side elevation partly in section showing the hinged edge of a door and its association with the door end of the fender.

Figure 10 is a sectional view taken on the line 10—10 of Figure 9.

Figure 11 is a fragmentary end view showing the door end of a fender.

Figure 12 is a fragmentary end view of one of the doors.

Referring in detail to the drawings, the numeral 1 indicates a motor vehicle body, the general design of which is to reduce air resistance. The characters 2 and 3 indicate the front and rear fenders and 4 and 5 represent the front and rear doors. The front and rear fenders are shaped to afford maximum protection to the body against splash from the wheels of the vehicle (not shown) also to reduce to a minimum air resistance. Joining the front and rear fenders is a running board 6, the frame of the vehicle being indicated by the character 7. The fenders 2 and 3 curve outwardly and downwardly from the body, portions of the doors 4 and 5 also curve outwardly and downwardly from the body matching said curvature of the fenders. The doors and fenders thus matched do away with irregular surfaces, consequently aiding in reducing wind resistance.

The detail of hinging of the doors on the body and the shaping of the door ends of the fenders will present a neat and attractive appearance to the vehicle body when the doors are in closed position. Also when the doors are open they will abut the door ends of the fenders to eliminate unsightly spaces between the doors and fenders.

By referring to Figure 1, it will be seen that the construction of the hinged edge of the rear door 5 and the door end of the rear fender 3 is reversed from that shown in Figure 1 in connection with the front door and the front fender. This showing clearly demonstrates a reversal of construction, that is, the construction that is built in the hinged edge of the door can be built into the door end of the fender and what is built in the door end of the fender can be built into the hinged edge of the door with the same advantages and results obtained. In describing the specific construction of the door and its associated fender reference in detail will apply to the front door and the front fender which detailed information if reversed will apply to the rear door and the rear fender.

The door 4 at its hinged edge is joined to a door post 8 by hinges 9, the latter being arranged in vertical alignment. A semicircular shaped extension 10 is formed on the hinged edge of the door adjacent to where the door curves outwardly from the body and the center of the extension 10 is in vertical alignment with the hinges. The door end of the fender 2 where said fender curves outwardly from the body has a recess 11 shaped to match the curvature of the extension 10. Also said end of the fender has a straight wall or face 12 to match and be engaged by a correspondingly shaped face or wall 13 of the door. Located within the door end of the fender 2 and secured on the body and spaced from the outwardly curved portion of the fender is a plate 14 to underlie the extension 10 when the door is closed, as shown in Figure 10. The plate underlying the extension 10 when the door is closed acts to close the space between the door and the fender, as shown in Figure 10, when the door is closed. The thickness of the extension 10 varies in accordance with the outward and downward curvature of the door wall, as shown in Figure 10, and the width of the face 12 is shaped correspondingly.

The hinged edge of the door has formed thereon below the extension 10 a portion 15 acting as a door check arm by cooperating with the stops 16 and 17. The portion 15 carries a cushion element 18 to engage with the stops 16 and 17 and to have wiping contact with an arcuately curved wall 19 on which the stops 16 and 17 are formed during the swinging movement of the door from one of its positions to another position. The wall 19 is arranged in the front fender at the door end thereof and is secured to the fender and to the door post 8. A curved wall 20 is also arranged in the fender 2 and is secured to the latter and to the body and abuts the wall 19 acting as a strengthening medium thereto and also to the fender. Between the door post 8 and the plate 19 a space is provided in which the portion 15 moves when the door moves towards an open position and when the cushion 18 contacts the stop 16 the door is checked also the outer wall of the door abuts the door end of the fender eliminating a space between the door and the fender. When the door assumes a closed position the cushion element 18 engages the stop 17 bringing the outer wall of the door flush with the wall of the front fender eliminating a space between the hinged edge of the door and the fender 2.

A construction of door and fender as specifically described will eliminate spaces occurring between the hinged edge of the door and the fender when the door is either in a closed or open position and when the door is in a closed position the outer wall of the door will lie in a plane within the walls of the fender adjacent thereto so as to eliminate obstructions or irregular surfaces occurring in motor vehicle body construction at the places where the door joins with the body and the fenders so that air currents may pass thereover with a minimum amount of resistance.

Having described the invention, I claim:

1. In combination with a motor vehicle body, a fender secured on said body and having a section curved outwardly and downwardly relative to the body, a door adjacent said fender and having a section conforming to the contour of said first mentioned section whereby to establish uniformity of contour between said door and fender and present an apparent continuation of the latter when said door is in closed position, said door hinged to said body between the ends thereof and in proximity to one end whereby to dispose said last mentioned end within said fender, one of said sections formed with a recess and the other of said sections formed with an extension operable within said recess and coacting with the last mentioned end of the door to preclude the formation of a space between the door and fender when the door is in open position.

2. In combination with a motor vehicle body, a fender secured on said body and having a section curved outwardly and downwardly relative to the body, a door adjacent said fender and having a section conforming to the contour of said first mentioned section whereby to establish uniformity of contour between said door and fender and present an apparent continuation of the latter when said door is in closed position, said door hinged to said body between the ends thereof and in proximity to one end whereby to dispose said last mentioned end within said fender, said sections having angular disposed abutting edges and one of said edges formed with a recess and the other of said edges formed with an extension operable within said recess and coacting with the last mentioned end of the door to preclude the formation of a space between the door and fender when the door is in open position.

CALVIN M. MATTHEWS.